(12) United States Patent
Blom et al.

(10) Patent No.: US 11,135,980 B2
(45) Date of Patent: Oct. 5, 2021

(54) FOLDING INTERIOR LINING PANEL OF A MOTOR VEHICLE

(71) Applicants: TREVES PRODUCTS, SERVICES & INNOVATION, Paris (FR); HONDA MOTOR Co LTD, Tokyo (JP)

(72) Inventors: Christophe Blom, Reims (FR); Gini Psymouli, Swindon (GB); Tohru Ohba, Swindon (GB)

(73) Assignees: TREVES PRODUCTS, SERVICES & INNOVATION, Paris (FR); HONDA MOTOR CO., LTD., Tokyo (JP)

( * ) Notice: Subject to any disclaimer, the term of this patent is extended or adjusted under 35 U.S.C. 154(b) by 105 days.

(21) Appl. No.: 16/493,144

(22) PCT Filed: Mar. 11, 2018

(86) PCT No.: PCT/FR2018/050562
§ 371 (c)(1),
(2) Date: Sep. 11, 2019

(87) PCT Pub. No.: WO2018/167409
PCT Pub. Date: Sep. 20, 2018

(65) Prior Publication Data
US 2020/0079291 A1    Mar. 12, 2020

(30) Foreign Application Priority Data

Mar. 16, 2017 (FR) ...................................... 1752164

(51) Int. Cl.
*B60R 5/04* (2006.01)

(52) U.S. Cl.
CPC .................................. *B60R 5/045* (2013.01)

(58) Field of Classification Search
CPC ......... B60R 5/045; B60R 5/048; B60R 13/02; B60R 13/01; B60R 13/011; B60R 2013/018; E05D 1/02
(Continued)

(56) References Cited

U.S. PATENT DOCUMENTS

| 4,351,555 A * | 9/1982 | Hashimoto | ............. B60R 5/044 |
| | | | 16/366 |
| 5,641,179 A * | 6/1997 | Imlach | ..................... B60J 11/06 |
| | | | 280/762 |

(Continued)

FOREIGN PATENT DOCUMENTS

| JP | H1120850 A | 1/1999 |
| JP | 2010076571 A | 4/2010 |
| JP | 2010241196 A | 10/2010 |

OTHER PUBLICATIONS

International Search Report issued in corresponding application No. PCT/FR2018/050562 dated Apr. 30, 2018.

*Primary Examiner* — Joseph D. Pape
(74) *Attorney, Agent, or Firm* — Murtha Cullina LLP

(57) ABSTRACT

The invention relates to a folding interior lining panel of a motor vehicle comprising a first flap and a second flap which are articulated to one another along two articulation edges. The flaps have edge faces of similar thicknesses. The flaps being articulated to one another by two strips positioned some distance apart. Each of the strips has a middle part, a first end part pressed closely against the first edge face by a first plate and a second end part pressed firmly against the second edge face by a second plate. A second strip is positioned between the first strips, the second strip has a middle part, a first end part pressed firmly against the first edge face by a third plate and a second end part pressed firmly against the second edge face by a fourth plate.

8 Claims, 3 Drawing Sheets

(58) Field of Classification Search
USPC .......................................................... 296/39.1
See application file for complete search history.

(56) References Cited

U.S. PATENT DOCUMENTS

| 9,428,113 B2* | 8/2016 | V .............................. B60R 5/045 |
| 2017/0101060 A1* | 4/2017 | Keimig ................... B60R 5/045 |

\* cited by examiner

FOLDING INTERIOR LINING PANEL OF A MOTOR VEHICLE

CROSS-REFERENCE TO RELATED APPLICATIONS

This application claims the benefit of International application number PCT/FR2018/050562, filed Mar. 11, 2018 and French application number 1752164, filed Mar. 16, 2017 the entire contents of which are incorporated herein by reference.

TECHNICAL FIELD

The invention relates to a folding interior lining panel of a motor vehicle.

BACKGROUND

It is known to produce a folding interior lining panel of a motor vehicle, the panel having the following features:
it comprises a first and a second flap which are articulated to one another along two respective articulation edges, by means of a plurality of strips, so as to enable a rotation of substantially 360° of one of the flaps in relation to the other, so that the panel may have a configuration of use, where the flaps are in the continuation of one another in a substantially co-planar manner, and two retracted configurations corresponding to a folding of 180° in one direction or the other, the flaps have at the edges a first and a second respective edge face of similar thicknesses.

The folding panel is notably intended to cover the luggage or the floor of a luggage compartment.

The fact of having two retracted configurations is for example dictated, in the case of a panel for covering a luggage compartment floor, by the fact that one face of the flaps may be covered with textile, for example in the form of carpet, the other face being covered with a washable covering, notably of the nature of a sheet of plastic material.

Thus, when the folding panel is in retracted configuration, it may be positioned against a wall of the luggage compartment by having a washable face, which may be useful when the compartment is loaded with a dirty load.

The strips applied in the articulation are usually attached, by the end parts thereof, at the border of the upper and lower faces of the flaps.

The result is a complexification of the manufacture of the panel in order to hide the areas for joining the strips to the flaps, this for aesthetic reasons, and also so that the areas do not form asperities likely to catch on objects loaded in the luggage compartment when the panel is intended to line such a compartment.

SUMMARY OF THE INVENTION

The aim of the invention is to overcome the drawbacks.

To this end, the invention proposes a folding interior lining panel of a motor vehicle, the panel having the following features:
it comprises a first and a second flap which are articulated to one another along two respective articulation edges, by means of a plurality of strips, so as to enable a rotation of substantially 360° of one of the flaps in relation to the other, so that the panel may have a configuration of use, where the flaps are in the continuation of one another in a substantially co-planar manner, and two retracted configurations corresponding to a folding of 180° in one direction or the other, the flaps have at the edges a first and a second respective edge face of similar thicknesses,
the flaps being articulated to one another by:
at least two first strips positioned some distance apart, each of the strips having:
a middle part, the dimension of which according to a direction perpendicular to the edges corresponds substantially to the thickness,
a first end part pressed firmly against the first edge face by a first plate, the plate extending substantially over the entire thickness of the edge face, the join between the middle part and the end part being situated at the upper border of the plate,
a second end part pressed firmly against the second edge face by a second plate, the plate extending substantially over the entire thickness of the edge face, the join between the middle part and the end part being situated at the lower border of the plate,
and at least one second strip positioned between the first strips, the strip having:
a middle part, the dimension of which according to a direction perpendicular to the edges corresponds substantially to the thickness,
a first end part pressed firmly against the first edge face by a third plate, the plate extending substantially over the entire thickness of the edge face, the join between the middle part and the end part being situated at the lower border of the plate,
a second end part pressed firmly against the second edge face by a fourth plate, the plate extending substantially over the entire thickness of the edge face, the join between the middle part and the end part being situated at the upper border of the plate.

With the arrangement proposed, it is pointless to hide the areas for joining the strips, since they are situated on the edge faces of the flaps, which helps to improve the aesthetics of the panel and also to avoid the presence of asperities likely to catch on objects loaded in the luggage compartment when the panel is intended to line such a compartment.

BRIEF DESCRIPTION OF THE DRAWINGS

Further specific features and advantages of the invention will appear in the following description, made with reference to the appended figures, wherein.

DETAILED DESCRIPTION

Figure 1A:
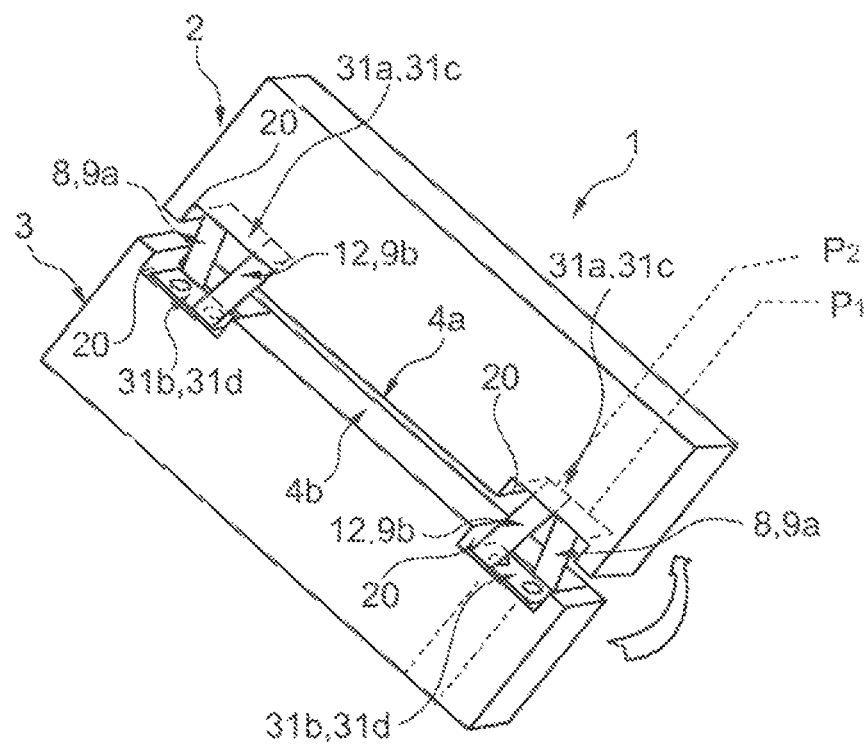
FIGS. 1a and 1b are perspective schematic views of a panel according to a first embodiment, the panel being in configuration of use (FIG. 1a), the strips being shown stretched for the requirements of the illustration, and in retracted configuration (FIG. 1b)
Figure 1B:
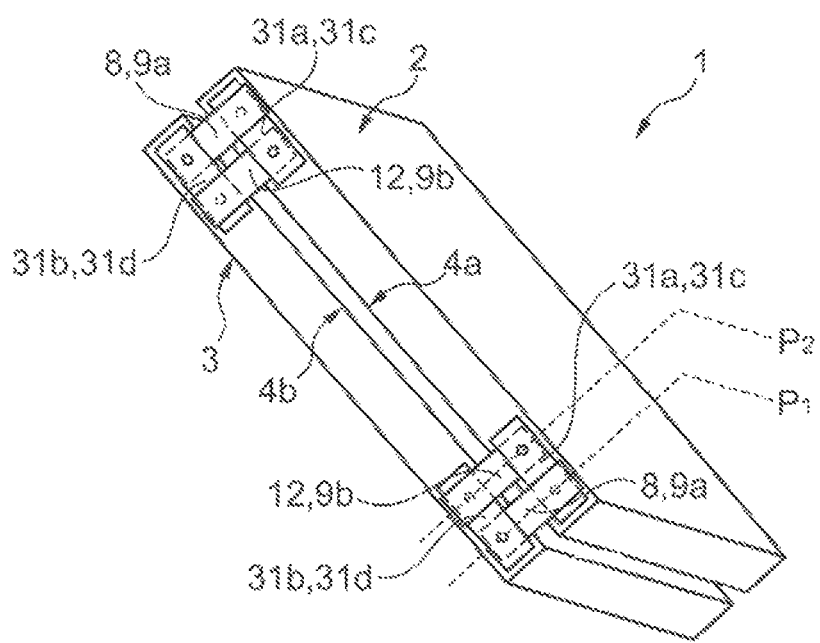
Figure 2A:
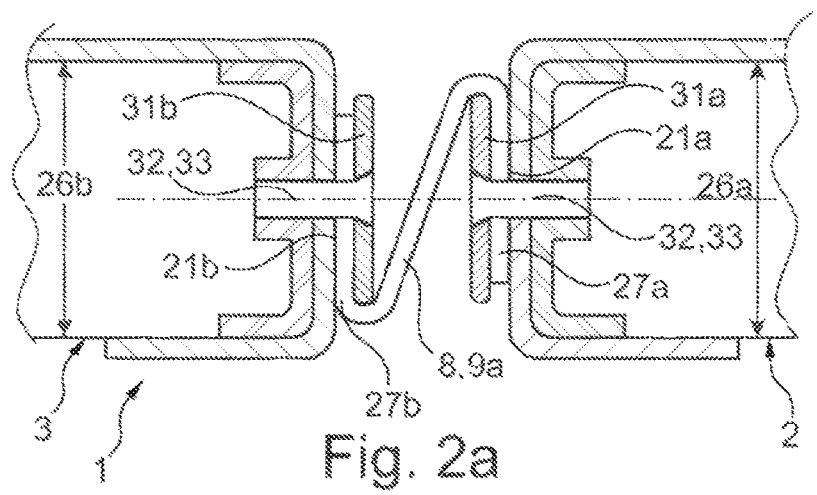
FIGS. 2a and 2b are cross-sectional schematic views according to a plane P1 of the panel in FIG. 1, the panel being in configuration of use (FIG. 2a), the strips being shown stretched for the requirements of the illustration, and in retracted configuration (FIG. 2b)
Figure 2B:
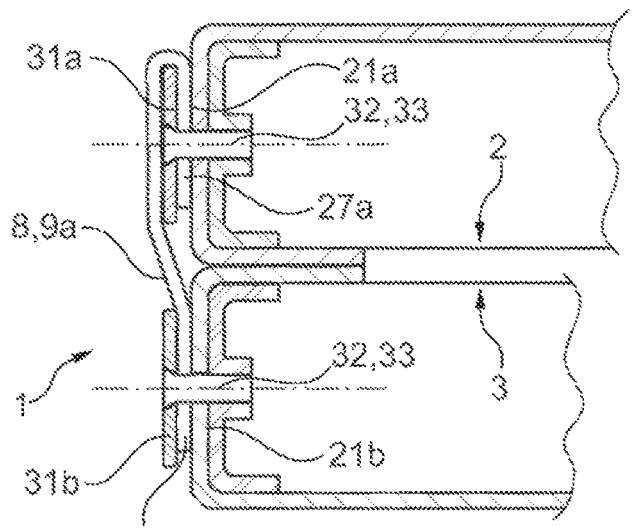
Figure 3A:
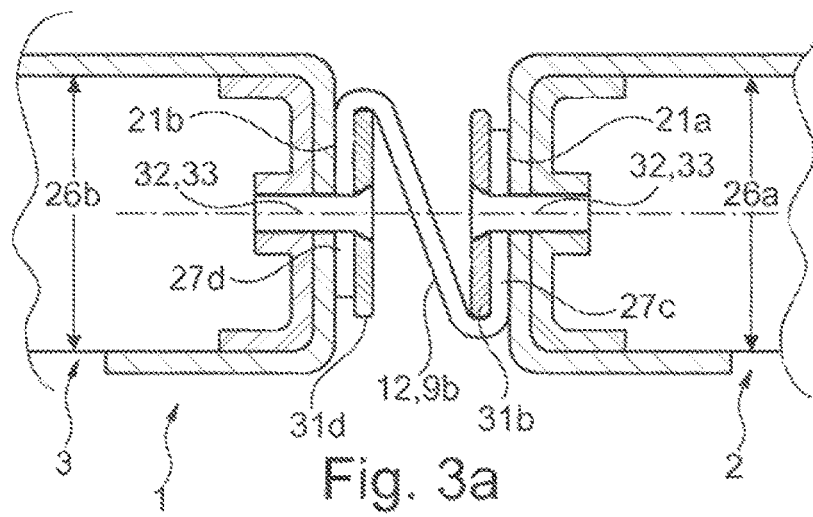
FIGS. 3a and 3b are cross-sectional schematic views according to a plane P2 of the panel in FIG. 1, the panel being in configuration of use (FIG. 3a), the strips being shown stretched for the requirements of the illustration, and in retracted configuration (FIG. 3b)
Figure 3B:
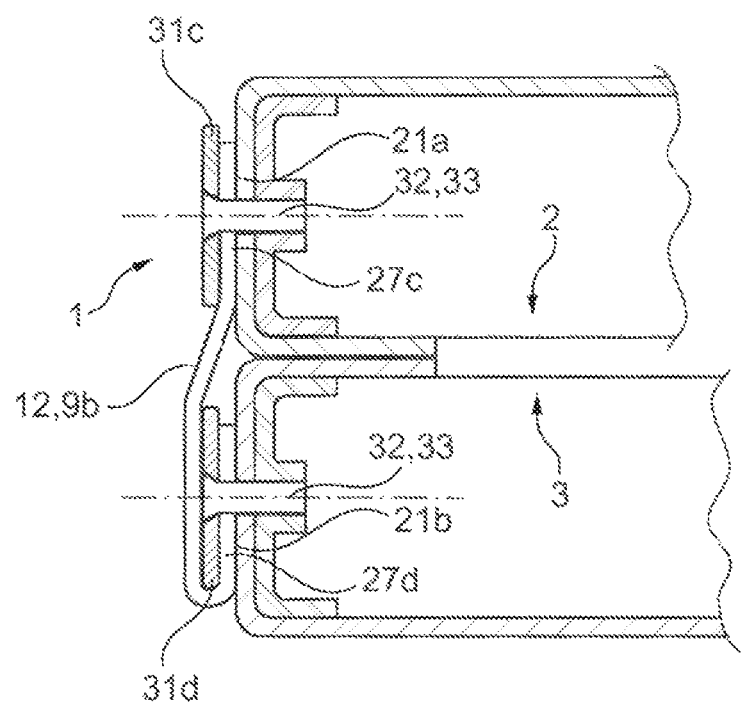
Figure 4:
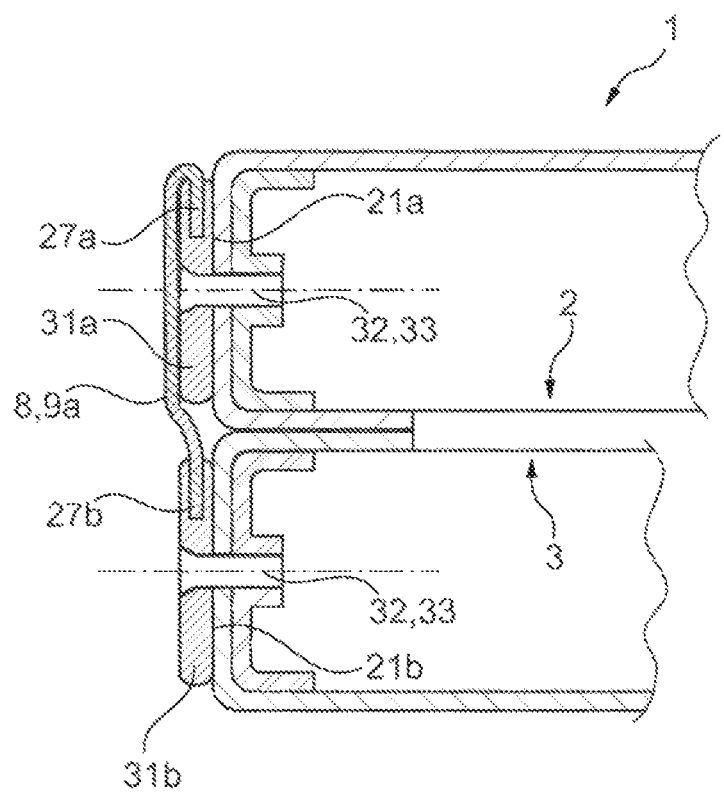
FIG. 4 is a view similar to FIG. 2b for a panel according to a second embodiment.

With reference to the figures, it is described a folding interior lining panel 1 of a motor vehicle, the panel having the following features:

it comprises a first 2 and a second 3 flap which are articulated to one another along two respective articulation edges 4a,4b, by means of a plurality of strips 8,12, so as to enable a rotation of substantially 360° of one of the flaps in relation to the other, so that the panel may have a configuration of use, where the flaps are in the continuation of one another in a substantially co-planar manner, and two retracted configurations corresponding to a folding of 180° in one direction or the other, the flaps have at the edges a first 21a and a second 21b respective edge face of similar thicknesses 26a,26b, the flaps being articulated to one another by:

at least two first strips 8 positioned some distance apart, each of the strips having:
- a middle part 9a, the dimension of which according to a direction perpendicular to the edges corresponds substantially to the thickness,
- a first end part 27a pressed firmly against the first edge face 21a by a first plate 31a, the plate extending substantially over the entire thickness 26a of the edge face, the join between the middle part and the end part being situated at the upper border of the plate,
- a second end part 27b pressed firmly against the second edge face 21b by a second plate 31b, the plate extending substantially over the entire thickness 26b of the edge face, the join between the middle part and the end part being situated at the lower border of the plate, and at least one—two in the first embodiment shown—second strip 12 positioned between the first strips, the strip having:
- a middle part 9b, the dimension of which according to a direction perpendicular to the edges corresponds substantially to the thickness,
- a first end part 27c pressed firmly against the edge face 21a by a third plate 31c, the plate extending substantially over the entire thickness 26a of the edge face, the join between the middle part and the end part being situated at the lower border of the plate,
- a second end part 27d pressed firmly against the edge face 21b by a fourth plate 31d, the plate extending substantially over the entire thickness 26b of the edge face, the join between the middle part and the end part being situated at the upper border of the plate.

According to the first embodiment shown, the plates 31a,31b,31c,31d at the non-assembled state are separated from the strips 8,12, the plates covering the end parts 27a,27b,27c,27d of the strips.

According to the first embodiment shown, the plates 31a,31b,31c,31d are provided with an opening 33 for passing through an anchoring element 32—notably in the form of a screw or rivet—on the relevant edge face 21a, 21b.

When the flaps 2,3 are based on cellular material, for example based on a honeycomb structure or resulting from an extrusion blow moulding, there may be provided a plate, not shown, rigidly connected to the flaps, for receiving the anchoring element 32.

According to the first embodiment shown, a first plate 31a is integral with a third plate 31c and/or a second plate 31b is integral with a fourth plate 31d.

According to the second embodiment shown, the plates 31a,31b,31c,31d are in the form of end pieces made of plastic material overmoulding the end parts 27a,27b,27c,27d of the strips 8,12.

According to the first embodiment shown, two first strips 8 are positioned substantially at lateral ends of the edges 4a,4b knowing that such an arrangement may of course be applied to all of the embodiments.

According to the embodiments shown, the flaps 2,3 are provided with housings 20 for receiving the plates 31a,31b, 31c,31d and the end parts 27a,27b,27c,27d of the strips 8,12, so that the plates and end parts do not form protruding in relation to the edge faces 21a,21b of the corresponding flaps 2,3.

According to one embodiment, the strips 8,12 are elastic and kept permanently taut regardless of the configuration of the panel 1.

Such an arrangement may guarantee a perfect close positioning of the articulation edges 4a, 4b, notably when the panel 1 is in covering configuration.

Of course, the strips 8,12 may alternatively be provided non elastic.

According to the embodiments shown, the plates 31a,31b, 31c,31d are substantially rectangular.

The invention claimed is:

1. A folding interior lining panel of a motor vehicle, the panel comprising:
   a first and a second flap which are articulated to one another along two respective articulation edges, with a plurality of strips, to enable a rotation of substantially 360° of one of the flaps in relation to the other, the panel being configured, where the flaps are substantially co-planar, and two retracted configurations corresponding to a folding of 180° in one direction or the other, the flaps have at the edges a first and a second respective edge face of similar thicknesses, and are articulated to one another by:
   at least two of the plurality of strips being first strips positioned some distance apart, each of the first strips having:
   - a middle part, the dimension of which according to a direction perpendicular to the edges corresponds substantially to the thickness,
   - a first end part pressed firmly against the first edge face by a first plate, the plate extending substantially over the entire thickness of the edge face, a first joining between the middle part and the end part being situated at the upper border of the plate,
   - a second end part pressed firmly against the second edge face by a second plate, the plate extending substantially over the entire thickness of the edge face, a second joining between the middle part and the end part being situated at the lower border of the plate, and at least one of the plurality of strips being a second strip positioned between the first strips, the second strip having:
   - a middle part, the dimension of which according to a direction perpendicular to the edges corresponds substantially to the thickness,
   - a first end part pressed firmly against the first edge face by a third plate, the plate extending substantially over the entire thickness of the edge face, a third joining between the middle part and the end part being situated at the lower border of the plate,
   - a second end part pressed firmly against the second edge face by a fourth plate, the plate extending substantially over the entire thickness of the edge face, a fourth joining between the middle part and the end part being situated at the upper border of the plate.

2. The panel according to claim 1, wherein the first, second, third and fourth plates at the non-assembled state are separated from the plurality of strips, the first, second, third and fourth plates covering the end parts of the plurality of strips.

3. The panel according to claim 2, wherein the first, second, third and fourth plates are provided with an opening for passing through an anchoring element on the relevant edge face.

4. The panel according to claim 2, wherein the first plate is integral with the third plate and/or the second plate is integral with the fourth plate.

5. The panel according to claim 1, wherein the first, second, third and fourth plates are in the form of end pieces made of plastic material overmoulding the end parts of the plurality of strips.

6. The panel according to claim 1, wherein the at least two first strips are positioned substantially at the lateral ends of the two respective articulation edges.

7. The panel according to claim 1, wherein the flaps are provided with housings for receiving the first, second, third and fourth plates and the end parts of the plurality of strips, the plates and end parts do not protrude in relation to the edge faces of the flaps.

8. The panel according to claim 1, wherein the plurality of strips are elastic and kept permanently taut regardless of the configuration of the panel.

* * * * *